Figure 1:
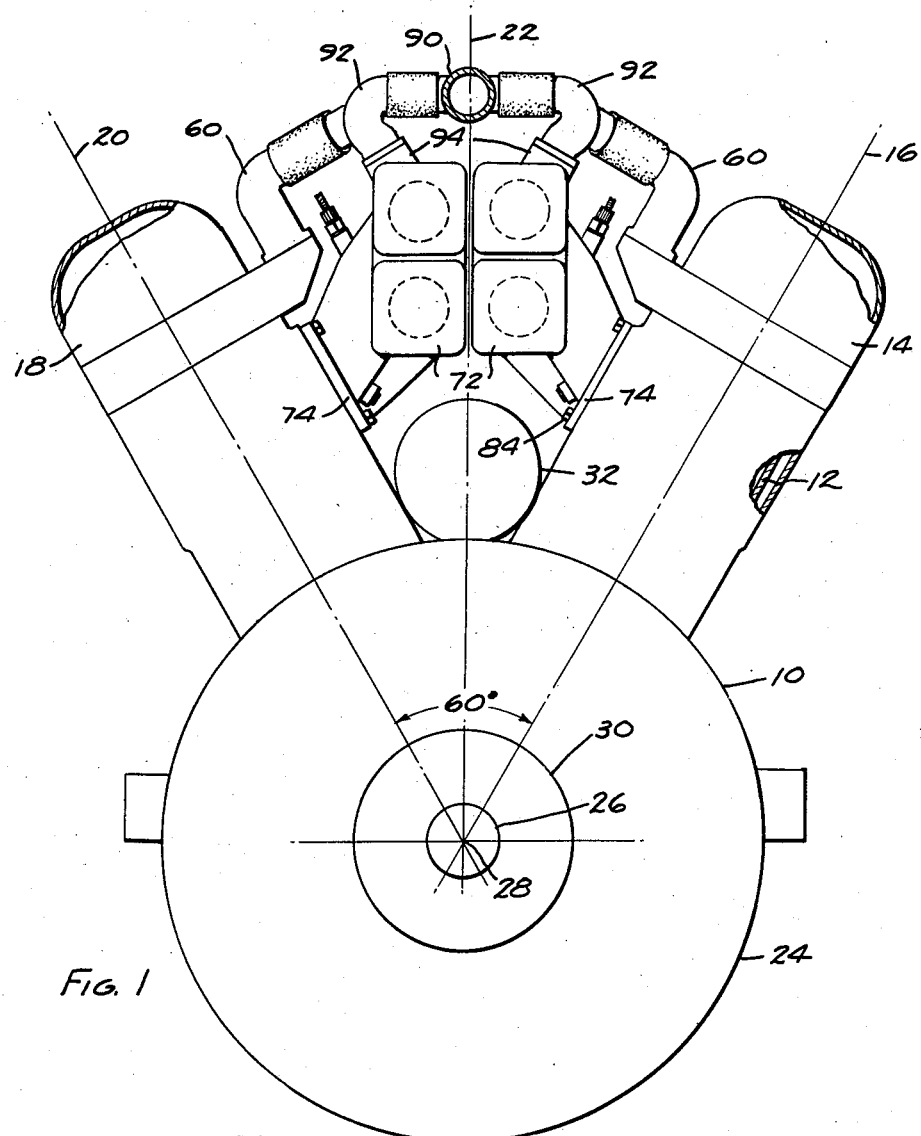

INVENTOR.
NORMAN W. RESKE
BY
Wilson, Redrow, and Gaines
ATTORNEYS.

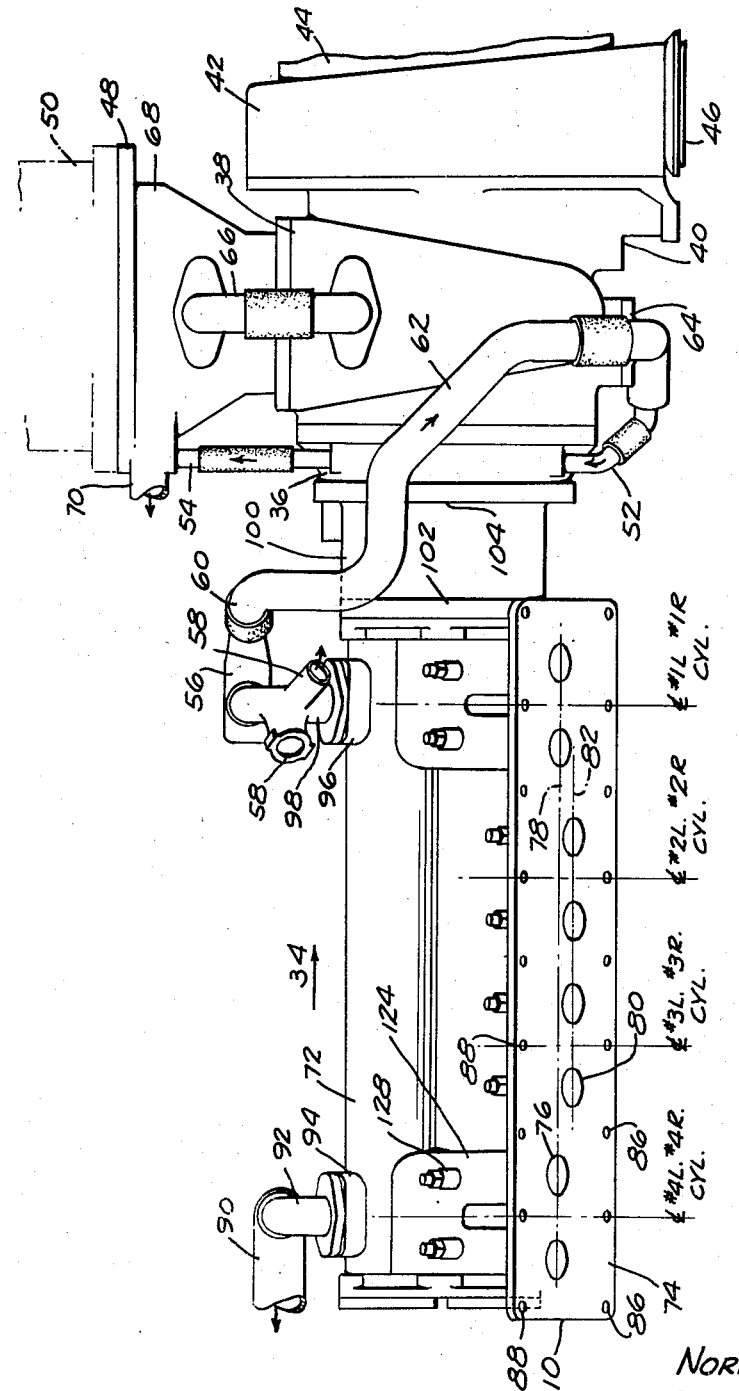

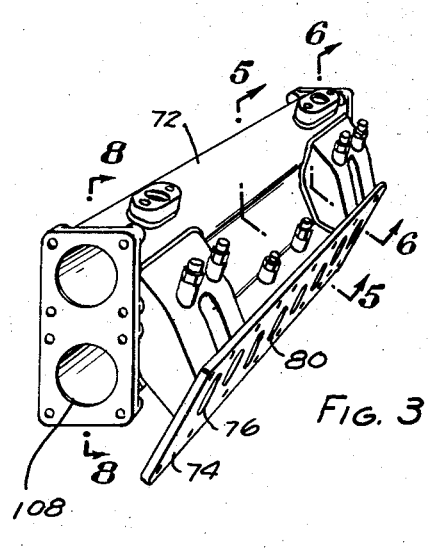

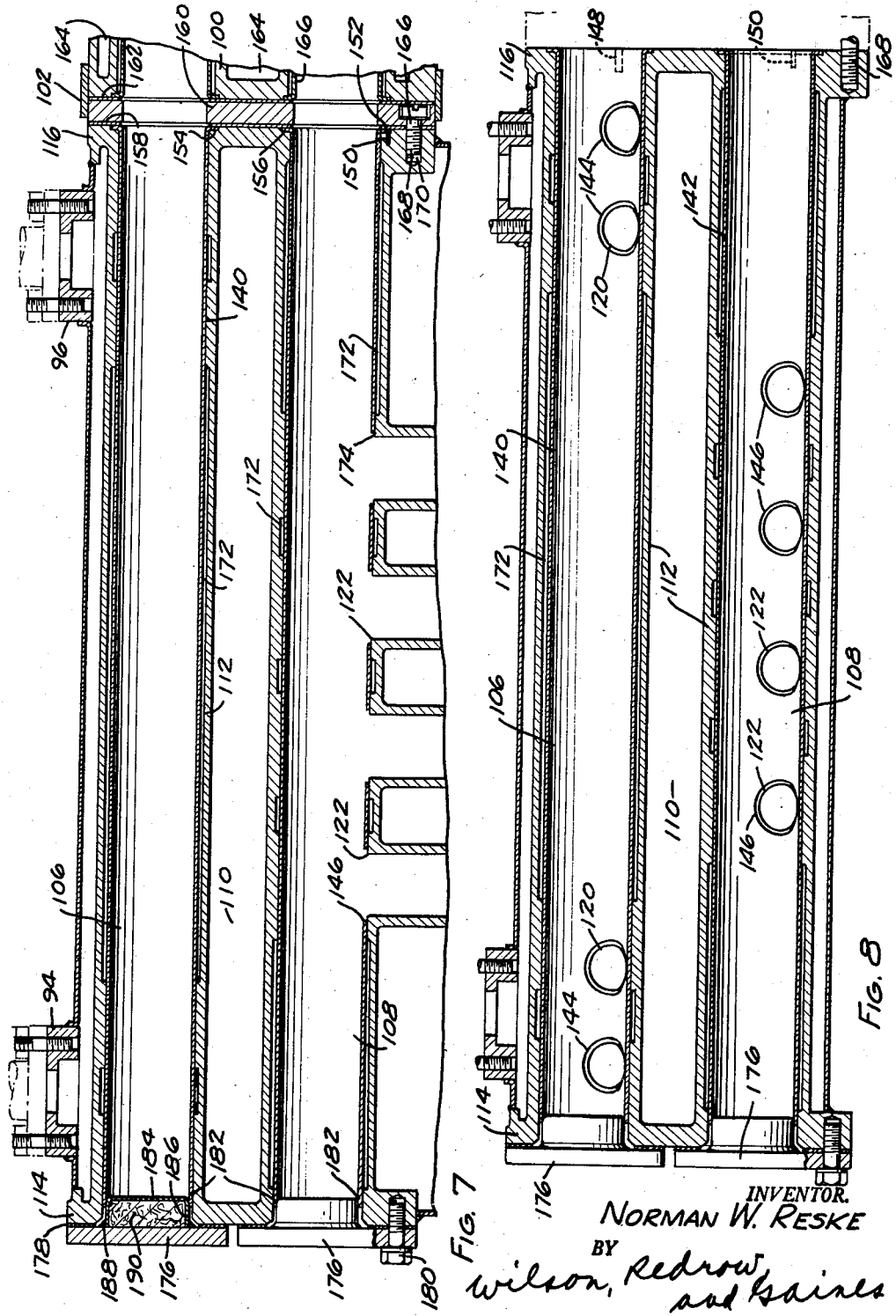

United States Patent Office 2,858,667
Patented Nov. 4, 1958

2,858,667

WATER COOLED EXHAUST MANIFOLD

Norman W. Reske, Detroit, Mich., assignor to Studebaker-Packard Corporation, a corporation of Michigan Application January 5, 1954, Serial No. 402,351

12 Claims. (Cl. 60—31)

The present invention relates to exhaust manifold structure for internal combustion engines and particularly to multiple path interchangeable manifolds which are arranged in groups of two or more and which are water cooled for adequately handling energy laden exhaust gases of the character generated by heavy turbo-charged diesel engines.

An object of the invention is the provision of a forced cooled manifold of a light metal such as an aluminum casting which is water cooled within a jacket of welded together sheets or plates of the same light metal.

Another object is to provide a light water cooled exhaust manifold having multiple parallel conduits for conducting exhaust gases and having liners therewithin which cooperate with the walls of the conduits to form annular dead air spaces serving as heat dams about the liners.

A further object of the invention is the provision of a manifold generally in accordance with the preceding paragraph, in which one end of one or all of the conduits is open and the other end has closure means therefor wherein a closed heat dam or insulating chamber is included so as to limit the surface temperature of the exterior of the closure means. The insulating chamber may contain a body of fibrous insulating material which contributes to the task of interrupting the path of heat flow to the exterior surface.

Another object of the invention is the provision of a single or multiple conduit water cooled exhaust manifold having inlet branches with their mouths in the sides of the conduit and an internal liner therefor having side openings registering with the mouths of the inlet branches and being of a relatively larger cross sectional diameter than each corresponding mouth so as to overlie the same regardless of the foreshortening and expansion of the liner along its length due to exhaust heat stresses and thermal shock or distortion resulting from the direct impingement of the hot exhaust gases on the liner.

Another object is to provide multiple path, interchangeable manifolds having a group arrangement and connected as a group to supply a turbo-charger unit, wherein a laterally removable coupling and a manifold adaptor plate secure together the group of manifolds and interconnect the same to the turbo-charger unit but in such a manner that they are disengageably series connected so as to be readily removable for the replacement or servicing of either the manifold group or the turbo charger unit without disturbing the other.

A further object is the provision of multiple path manifold structure having branch inlets for conducting motive exhaust gases from a turbo-charged multi-cylinder engine, wherein the branches are arranged to receive gases from cyclically phased apart cylinders of selected groups such that no exhaust valve overlap occurs as among the cylinders of any selected group.

Another object of the invention is the provision of a single or multiple conduit water cooled exhaust manifold having stationary inlet branches with their mouths in the sides of the conduit and having a tubular liner provided with side openings registered therewith, in which the liner is stationarily indexed and held fast against movement in a direction about its axis and in an axial direction so as to insure substantial registration between the liner openings and the branch inlet mouths at time of assembly and at all other times.

Figure 9:
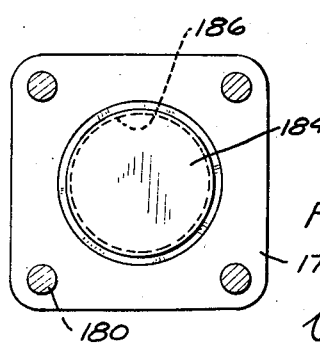

Further features, objects and advantages will either be specifically pointed out or become apparent when for a better understanding of the invention reference is made to the following written description taken in conjunction with the accompanying drawings in which Figures 1 and 2 are rear end and side elevationals of a diesel engine assembly to which the present manifold invention is shown applied;

Figs. 3 and 4 are perspective views from each side of one of the multiple path exhaust manifolds of Figure 1;

Figures 5, 6, 7 and 8 are sections of the manifold taken along lines 5—5, 6—6, 7—7 and 8—8 appearing in Figures 3 and 4; and Figure 9 is a face view of a closing plate applied to the manifold of the preceding figures.

In Figures 1 and 2 of the drawing, a 60° type V8 engine 10 is shown which has half its plurality of cylinders 12 forming a left bank 14 disposed in a first longitudinal plane 16 and its remaining half of the cylinders forming a right bank 18 disposed in a second longitudinal plane 20. The noted 60° angle included between the two banks 14 and 18 is vertically bisected by the longitudinal midplane 22 of the engine 10 such that each of the planes 16, 20 of the cylinder banks forms a 30° dihedral angle with respect to the engine midplane 22.

The engine 10 includes a generally cylindrically formed crank case 24 having appropriate main bearings, not shown, in which a crank shaft 26 for the engine is set to rotate about the principal horizontal axis 28 thereof. The vertical plane containing the principal axis 28 is coincident with the longitudinal midplane 22 of the engine 10. The crank shaft 26 at its rear end carries a vibration damper 30 which together with the crank shaft 26 is concentrically disposed about the principal axis 28. An auxiliary generator is schematically indicated at 32 at a location included in the mutually defined 60° angle between the opposed banks of cylinders 14 and 18. At its forward or drive end which is indicated in the direction of an arrow 34 in Figure 2, the engine 10 has a turbine inlet shroud 36 provided for an exhaust gas driven gas turbine component 38 forming part of a turbo-charger unit 40. A compressor component 42 is driven by means of a common shaft, not shown, connected to the gas turbine component 38 and receives atmospheric air through a filter carrying inlet 44. The compressor or supercharger component 42 compresses the atmospheric air received thereby and discharges the same under pressure through an outlet 46 which is connected to an after cooler for cooling the thus compressed air and supplying the same in cooled super-charged condition to the engine 10 for supporting the combustion process in the cylinders 12 thereof. The gas turbine component 38 has a flanged fitting 48 to which a diagrammatically shown waste gate pipe 50 is shown connected for finally discharging the spent combustion gases supplied by the engine. Prior to discharge, however, these combustion gases are fed from the engine 10 through the shrouding 36 and form a stream of motive fluid for driving the gas turbine component 38. The shrouding 36 is hollow in its outer periphery to define passages for cooling water supplied from an inlet pipe 52 and discharged through an outlet pipe 54.

A common fresh water header fitting 56 is secured to the top of the drive end of the engine 10 and communicates with a pair of sampling pipes 58 which lead respectively to a temperature indicator well and to a temperature alarm well, not shown. The fitting 56 serves two main branches, one at 98 which is later described and the other at 60 for supplying a pipe 62 which is split and connected to the noted shroud cooling passage 52 and to another passage 64 for conducting cooling water to an exterior jacket about the gas turbine component 38. A pipe 66 transfers the discharged cooling water from the gas turbine jacket into a set of hollow passages about the previously noted outlet discharge 68 and such cooling water is there united with the water discharged from the shrouding outlet 54 and returned in a common pipe 70 to a water circulating pump mounted in association with the engine 10 but not shown.

For purposes of ready identification the cylinders 12 of each bank are numbered in order from the front of the engine in the general direction of the engine rear which is opposite from the direction of the arrow 34 in Figure 2; thus, in order, the cylinders of the right bank 18 are successively 1R, 2R, 3R and 4R and correspondingly the cylinders in the left bank 14 are numbered 1L, 2L, 3L and 4L. The firing order of the engine contemplated is preferably 1L, 4R, 3L, 2R, 4L, 1R, 2L, and 3R for reasons hereinafter more fully set forth. Suffice it to say, for present purposes, however, that the extent of exhaust valve opening for each cylinder amounts to 282° of crank shaft rotation in one physically constructed embodiment and it is essential that the individual cylinders of each bank be phased in their cylical operation so as to be 360 crank shaft degrees apart with respect to one other cylinder thereof and that no two cylinders either simultaneously or overlappingly discharge into the same exhaust manifold gas flow conduit. It is preferable, though not essential, that each cylinder 12 be provided with two exhaust valves and two exhaust passages, each separately connected to one gas flow conduit of the associated manifold.

An exhaust handling pair of interchangeable multiple path manifolds 72 is provided in a generally symmetrical disposition at opposite sides of the longitudinal mid-plane 22 of the engine 10 so as to be contained in the included angle mutually defined by the respective cylinder banks 14 and 18. Each manifold of the pair 72 has a side flange 74 arranged to be disposed in a plane at 30° with respect to the vertical. The side flange 74 of each manifold 72 has a first series of longitudinally spaced apart ports 76 disposed along a common axis 78 and a second series of spaced apart ports 80 disposed along a common axis 82 which is parallel to but transversely offset with respect to the axis 78 in their common 30° plane just noted.

Each of the attached flanges 74 is sealed as by a one-piece gasket to the adjacent cylinder bank and is secured thereto by a plurality of bolts 84 of a number corresponding to the sets of bolt holes 86 and 88 which are preferably provided in the aggregate number of 18 per flange. A water outlet pipe 90 common to the two manifolds 72 at their rear or blanked-off ends, conducts discharged water away from a pair of transversely opposed separate pipes 92 which are connected by appropriate flanged fittings to the individual water discharge bosses 94 provided on the manifolds 72. The initial fresh water for cooling the manifolds 72 is supplied to an inlet boss 96 provided at the front end of each manifold which is connected by the suitably fitted pipe 98 which, as already noted, is connected to the supply pipe 56.

The multiple flow exhaust gas paths provided by the pair of manifolds 72 discharge through a corresponding number of exhaust gas passages formed in a vertically-removable water-jacketed coupling 100. A pair of hoop-like clamping bands 102, 104 is provided at each end of the coupling 100 and serves to fix and center the same in much the same manner as would a set of bolts. However, lateral removal of the bands 102, 104 permits convenient vertical upward removal of the coupling 100 without necessarily disturbing the shrouding 36 or the manifolds 72.

The two multiple path manifolds 72 are interchangeable with and identical to one another and in the interests of brevity, only one of these manifolds 72 is particularly shown according to Figures 3, 4, 5, 6, 7, 8, and will be specifically described in connection therewith. The manifold 72 there shown includes a set of parallel vertically spaced gas flow passages, preferably two in number, of which the upper gas flow passage or conduit 106 is disposed above the lower gas flow passage 108 by about the same dimension of each path as the diameter thereof so as to include a substantial longitudinal space 110. The two sets of conduit walls 112 which define these passages or paths have sets of common end flanges indicated respectively at 114 at their rear end and at 116 at the front, or forward, end. The respective walls 112 are provided with pairs of longitudinally aligned side openings or ports such as at 120 in the upper gas flow path 106 and at 122 in the lower gas flow path 108. Corresponding pairs of transverse inlet branches for the manifold 72 connect each pair of ports, for instance the pair of ports 120 at the rear end of the upper path 106, to a corresponding number of transversely aligned ports such as at 76 in the side flange 74 of the manifold. For purposes of the foregoing nature, a pair of exhaust inlet branches 124 define a path which extends steeply downwardly and each has a tubular well 126 formed therein for receiving a fitting 128 which carries a suitably electrically operated temperature sensing element 130. Each pair of ports 122 in the lower gas flow conduit 108 is communicatively connected to a pair of transversely aligned ports 80 formed in the flange 74 by means of a corresponding pair of additional exhaust inlet branches 132 which respectively define two gradually sloping lateral branch inlets 132. Similarly, a tubular well 134 is formed integral with each inlet branch 132 and receives a suitable fitting 136 which carries a temperature sensing element 138; the sensing elements 130, 138 are useful for observing operation of the engine from a central remote reading instrument disposed at the engine instrument panel, not shown.

The walls or conduits 112 for the gas flow passages and the end and the side flanges 114, 116, 74 and the other integral parts such as the tubular wells 134 and the exhaust passages 124, 132, are integrally cast together from a common metal, preferably cast aluminum in which the branch inlet passages and ports are formed by sand cores. A tubular metal liner 140 is provided for the upper gas passage 106 and another tubular metal liner 142 is provided for the lower gas flow passage 108. The liners 140, 142 are formed of heat resistant material, preferably rolled sheet metal such as stainless steel, and it is to be noted that the coefficient of expansion of the stainless steel contemplated happens to be roughly equal to the coefficient of expansion of the aluminum material for the cast manifold structure. The liner 140 for the upper passage has a set of registering openings 144 which are paired and register with the corresponding inlet-connected mouths or ports 120 in the manifold walls 112. In one physically constructed embodiment of the present invention the diameter of the openings 144 was ¼ in. larger than the approximate 2 inch diameter of the cored port openings in the walls 112 of the aluminum casting. The liner 142 in the lower gas path 108 has a similarly oversized set of openings 146 which by pairs are in registry with the side openings 122 in the walls 112 forming the lower gas flow path 108. The series of paired openings 144 in the stainless steel liner 140 are longitudinally aligned with respect to an indexing pin 148 which is carried by the end flange 116 of the casting and similarly the openings 146 in the liner 142 are longitudinally aligned with respect to another indexing pin 150 which is carried by the end flange 116. The head of the pin 150 fits within and engages the sides of a notch 152 formed in the periphery of the flanged end 154 of the stainless steel liner 142 and similarly the pin 148 engages a peripherally located notch in the end flange 154 of the stainless steel liner 140. Each of the flanges 154 is received flush within a recess 156 formed in the flange 116 and cooperatively produces a smooth seating surface to which a sealing gasket 158 is clamped by means of bolted-on adapter plate 160. The adapter plate 160 has two sets of openings, each set of which registers with one of the pair of gas flow paths in each of the interchangeable manifold structures. The adapter plate 160 in turn receives a sealing gasket 162 which seals the same to the previously described vertically shiftable coupling 100 which contains a set of water cooling passages indicated at 164. An individual stainless steel liner as at 166 may also be provided in each of the four exhaust gas passages of the coupling 100. The clamping band 102 previously described serves to hold the coupling 100 in exact registry with the adapter plate 160 and in similar fashion the previously described clamping band 104 holds the coupling 100 in aligned registry with the water cooled shrouding 36 for the turbo charger unit at the forward end of the engine. The adapter plate 160 has a set of recessed or counter bored openings 166 therein for receiving the heads of a corresponding number of threaded fasteners 168 which lie flush with the surface thereof beneath the gasket 162 and which threadably engage suitably tapped bores 170 in the end flange 116 at the front of the manifold at 116. Removal of the coupling 100 in a vertical direction makes available an adequate clearance space for working room between the manifolds 72 and the turbo charger shrouding 36 so as to accommodate suitable tools for removing the fastening bolts 168 and for subsequent removal of the adapter plate 160. As installed, the end flange 156 of each stainless steel liner is securely held against rotation and against axial movement by reason of its dual engagement with the pins 148, 150 as appropriate and with the adapter-plate-supported sealing gasket 158. At either side of the registered ports and openings 120, 144, 122, 146 in the walls thereof, the respective parts 112 and 140, 142 are relatively relieved so as to provide dead-air-formed, annular insulating spaces at 172 included between their adjacent interfitting surfaces. The cast metal walls 112 are preferably the ones which are recessed so as to be annularly relatively relieved and thus these walls provide sets of annular lands 174 which are upraised and physically contact the stainless steel liners adjacent the openings 144 and 146 therein. The enclosed dead air spaces 172 which result are therefore completely isolated from, and do not communicate with, the interior of the gas flow passages 106, 108.

A set of two blanking plates at 176 closes off the rear ends of the gas flow passages 106, 108 and each plate is sealed and secured to the adjacent end flange 114 by an appropriate gasket 178 and a set of threaded hold-down fasteners 180. In the normal operation of the engine 10 the temperature within the gas flow passages 106, 108 may be maintained steadily at a temperature as high as 1200° Fahrenheit, for instance. Even though the coefficient of expansion of the stainless steel liners and the cast aluminum walls 112 is approximately the same, the location of the stainless steel is such that it will grow to be the hotter part and tend to expand; thus the liners 140, 142 each have a free end 182 which shifts longitudinally of the gas flow passages 106, 108. The resulting minute shifts of the free end 182 of the liners due to heat stress are accommodated within an annular path of travel defined by the conduit structure 112 and the associated spaced apart surface of a cylindrically walled cup-shaped element now to be described. The intensity of the 1200° temperature within exhaust passages is such as to cause the outer face of the blanking plates 176 to reach a temperature as high as 410° Fahrenheit unless corrective measures are taken.

Illustrative of one means for reducing this surface temperature of the blanking plates 176 is a cup-shaped element having a flattened base 184 and integral cylindrical walls 186 which are welded as at 188 to the closing plate 176 so as to define a chamber 190. Within the chamber 190 a heat resistant blanket of asbestos or other fibrous insulating material may be provided such as commercially marketed Thermoflex material. In one test installation, the provision of the cup-shaped member and the self-contained body of insulating material therein, best seen in face view in Figure 9, was such under operating conditions as to reduce the outside face temperature of the blanking plate 176 to 238° Fahrenheit as compared to the normally experienced temperature of 410° Fahrenheit previously noted.

In one physically constructed embodiment of the present invention the cast aluminum walls 112 were $3/16$ of an inch thick and the stainless steel liners were separate pieces of round section tubing having a wall thickness of $1/16$ of an inch. At periodic locations along their lengths the walls 112 of the casting had a plurality of transversely protruding circumferentially aligned bosses 191 which were approximately a quarter of an inch thick in their radial dimension. A set of cover sheets of $1/8$ inch aluminum plate was applied to the cast manifold structure so as to rest on the bosses 190 to form $1/4$ inch thick water jacket spaces 192 and 194 which were concentric with the upper and lower gas flow paths 106, 108.

Each aluminum plate just referred to is provided with a reversely bent portion 196 which cooperates with the space 110 between paths to define a central water chamber in order to complete the water jacket about the longitudinally extending flow path defining walls 112. The aluminum sheets are welded together as at 198 to form a longitudinal seam and at their opposite extremities are welded as at 200 to the side flange 74 of the aluminum casting. The water fitting 94 and the aluminum sheets are welded together in a water tight connection as at 202 and the various other fittings and connections have welds appropriately provided as at 204, 206. The latter connection at 206 secures a water temperature tap fitting 208 to each of the paired manifolds 72.

In normal operation of the engine 10, the combined insulating effect of the concentric dead air spaces 172 and the water jackets 192 prevents the temperature of the exterior of the aluminum plate from exceeding approximately 200° Fahrenheit as compared to the 1200° Fahrenheit exhaust gas temperature prevailing within the upper and the lower gas flow passages 106, 108. It is to be noted from a comparison of Figures 2 and 3 that the paired cylinders numbered 1L and 4L discharge in common into the upper gas flow path 106 of the left hand one of the manifolds 72 and that the cylinders numbered 2L and 3L commonly discharge into the lower gas flow path 108 of the left hand one of the pair of manifolds 72. From a study of the previously noted firing order of the engine it will be immediately recognized that the cylinders 1L and 4L, at least with respect to the left hand bank in which they are located, fire 360 crank shaft degrees apart relative to one another and similarly the cylinders 2L and 3L relatively fire 360 crank shaft degrees apart. The result is that though the paired exhaust valves for each cylinder remain open for 282 crank shaft degrees of rotation there is no possible overlap as between the pairs of valves and in fact an interval of about 60 crank shaft degrees occurs between the time that the exhaust valves of each of the two cylinders of a pair is open. The same situation prevails in the right hand bank 18 and its cylinders number 2R and 3R discharge in the lower gas flow path 108 at different cyclical times and the cylinders number 1R and 4R discharge at different times in the upper gas flow path 106 of the right hand one of the pair of manifolds 72. The resulting separate pulses of exhaust gas fed into each of the pairs of upper and lower paths 106, 108 provides a desirable staggered rate of flow for motive gases through the adapter plate 160, the coupling 100, thence through the shrouding 36 and into the gas turbine component 38. The spent products of combustion are thereafter exhausted into the waste gate pipe 50 already described.

As herein disclosed, the invention is shown applied to a 60° type of multiple bank prime mover shown in the form of a V8 diesel engine. It is evident that with little or no modification the advantages hereof may be readily adapted to two-bank V8 type engines of other angularities between the two banks and also to other multiple bank engines of the diesel, gasoline, or other types. So also the drawing shows liners anchored and indexed by a pin at the discharge end of the manifold conduits but self-evidently other portions of the liners may preferably be indexed and anchored, for instance the portion of the liner at the closed end of the manifold conduits. The annular dead air chambers 172 are shown to be voids and the cylindrical heat dam chamber 190 is shown to contain a body of fibrous insulating material but it is not essential to the invention that the chambers 172 be unoccupied and indeed both of the chambers 172 and 190 may contain insulation material or remain unoccupied as deemed most advantageous.

Variations within the spirit and scope of the invention described are equally comprehended by the foregoing description.

What is claimed is:

1. An exhaust manifold for a multi-cylinder internal combustion engine comprising a plurality of separate conduits disposed side by side and closed at one end of said manifold and open at the other or discharge end thereof, each of said conduits having a plurality of paired inlet branches of which the two branches of each pair are adapted for connection to a like number of exhaust ports of one of a selected group of dual exhausting cylinders of said engine, each of said conduits further having a plurality of alternating lands and grooves transversely disposed in the sides of the interior thereof, and an individual longitudinally extending liner for each conduit received on the lands thereof and cooperating with the grooves to define a plurality of closed dead air spaces, said conduits and the associated liners having means establishing cooperation therebetween to hold each liner at one end in a position fast against movement in a direction about its axis and in an axial direction, each liner having a plurality of openings in the side thereof at points in the planes of the lands and having a dimension predeterminedly larger than the cross section of the mouths of the adjacent inlet branches and the just noted position of the liner being such that each opening registers with and extends at least slightly laterally beyond the mouth of the adjacent inlet branch at all points thereabout.

2. In combination, an exhaust handling pair of interchangeable multiple path manifolds symmetrically disposed at opposite sides of a common longitudinal plane and having transversely aligned end flanges each structurally intergrating the walls of the multiple path structure at the ends of an individual manifold, each manifold having a series of longitudinally aligned ports in the side of the wall of each exhaust path therein and each port being axially spaced apart from all similar ports, a tubular liner within each path having one end adjacent the corresponding manifold flange at that end and having a free opposite end, openings in the sides of each liner corresponding in number and location to, and registering with, the adjacent ports, means rendering said one liner end fixed in a predetermined longitudinally and angularly indexed position relative to the path forming walls of the structure thereabout whereby the fixing of only one end holds the liner fast against undesired shift in a direction about its axis yet accommodates relative contractural and expansible movement of the free end of the liner in an axial direction with respect to he fixed end, each of said tubular liners and the associated walls of the manifold path being relatively relieved along adjacent portions of their lengths to form annular enclosed dead air spaces, jacket means surrounding each manifold in spaced apart relationship to define a water jacket common to the exterior of the walls defining the multiple paths and having longitudinal portions of arcuate cross section concentric with respect to the dead air spaces, closure means individual to the multiple paths and each defining a transverse insulation-containing chamber thereacross adjacent the free end of the tubular liner, and a coupling-engaging adaptor plate common to the pair of manifolds at the end corresponding to said one liner end and having sunken type fasteners bolting the same to both of the adjacent flanges in sealable gas tight relationship.

3. In combination, an exhaust handling pair of interchangeable multiple path manifolds symmetrically disposed at opposite sides of a common longitudinal plane and having transversely aligned end flanges each structurally integrating the walls of the multiple path structure at the ends of an individual manifold, each manifold having a series of longitudinally aligned ports in the side of the wall of each exhaust path therein and each port being axially spaced apart from all similar ports, a liner within each path having one end adjacent the corresponding manifold flange at that end and having a free opposite end, openings in the sides of each liner corresponding in number and location to, and registering with, the adjacent ports, means rendering said one liner end fixed in a predetermined longitudinally and angularly indexed position relative to the path forming walls of the structure thereabout whereby the fixing of the one end holds the liner fast against undesired shift in a direction about its axis and provides a fixed reference point toward and away from which the free end of the liner expansibly and contractually moves in an axial direction, each of said tubular liners and the associated walls of the manifold path being relatively relieved along adjacent portions of their lengths to define closed heat-interrupting chambers formed according to a path of revolution, jacket means surrounding each manifold in spaced apart relationship to form an included water jacket common to the exterior of the walls defining the multiple paths and having longitudinal portions of arcuate cross section concentric wtih respect to the heat interrupting chambers, and closure means individual to the multiple paths and each defining a closed heat interrupting chamber formed transversely thereacross according to a path of revolution adjacent the free end of the tubular liner.

4. In combination, an exhaust handling pair of interchangeable multiple path manifolds symmetrically disposed at opposite sides of a common longitudinal plane and having transversely aligned end flanges each externally structurally integrating the walls of the multiple path structure at the ends of an individual manifold, each manifold having a series of longitudinally spaced apart ports in the side of the wall of each exhaust path therein, a tubular liner within each path having one end adjacent the corresponding flange at that end and having a free opposite end, oversize openings in the sides of each liner corresponding in registered location with and extending laterally beyond the mouth of the adjacent ports, means rendering a portion of each liner fixed in a predetermined longitudinally and angularly indexed position relative to the path forming walls of the structure thereabout whereby the fixed portion bodily holds the liner fast against undesired shift in a direction about its axis yet free to accommodate relative contractual and expansible movement of the free end thereof in an axial direction, each of said tubular liners and the associated wells of the manifold path being relatively relieved along adjacent portions of their lengths to form annular enclosed dead air spaces, jacket means surrounding each manifold in spaced apart relationship to define a water jacket common to the exterior of the walls of the multiple paths and having longitudinal portions of arcuate cross section concentric wtih respect to the dead air spaces, and closure means individual to the multiple paths and forming transversely disposed closed insulation containers across the path adjacent the free end of the tubular liner, said containers and the adjacent walls of said structure mutually defining an annular path through which the free end of the liner minutely travels under thermal stress.

5. In combination, an exhaust handling pair of interchangeable multiple path manifolds symmetrically disposed at opposite sides of a common longitudinal plane and having transversely aligned end flanges each externally structurally integrating the walls of the multiple path structure at the ends of an individual manifold, each manifold having a series of longitudinally spaced apart ports in the side of the wall of each exhaust path therein, a tubular liner within each path having one end adjacent the corresponding manifold flange at that end and having a free opposite end, oversize openings in the sides of each liner corresponding in number and location to and extending in registration laterally beyond the adjacent ports, means rendering a portion of each liner fixed in a predetermined longitudinally and angularly indexed position relative to the path forming walls of the structure thereabout whereby the fixed portion bodily holds the liner fast against undesired shift in a direction about its axis yet free to accommodate relative contractual and expansible movement of the free end thereof in an axial direction, each of said tubular liners and the associated walls of the manifold path being relatively relieved along adjacent portions of their lengths to form annular enclosed dead air spaces, jacket means surrounding each manifold in spaced apart relationship to form an included water jacket common to the exterior of the walls defining the multiple paths and having longitudinal portions of arcuate cross section concentric with respect to the dead air spaces, and closure means individual to the multiple paths and forming a transversely disposed closed insulation container across the path adjacent the free end of the tubular liner, said closed container cooperating with the adjacent path forming walls to define an annular recess having a mouth within which the adjacent free end of the tubular liner is received.

6. An exhaust manifold having multi-cylinder internal combustion engine comprising two separate conduits disposed side by side and closed at one end of said manifold and open at the other or discharge end thereof, each of said conduits having a plurality of paired inlet branches of which the two branches of each pair are adapted for connection to a like number of exhaust ports of one of a selected group of dual exhausting cylinders of said engines, said two conduits being included in a common aluminum casting and further having a plurality of alternating lands and grooves cast therein so as to be transversely disposed in the sides of the interior thereof, and an individual longitudinally extending liner for each conduit received on the cast-in lands thereof and cooperating with the grooves to define closed heat interrupting chambers, said conduits and the associated liners having means establishing cooperation therebetween to hold each liner at one end in a position fast against movement in a direction about its axis and in an axial direction, each liner having a plurality of openings in the side thereof at points opposite the lands and having a dimension predeterminedly larger than the cross section of the mouths of the adjacent inlet branches and the just noted position of the liner being such that each opening registers with and extends at least slightly laterally beyond the mouth of the adjacent inlet branch at all points thereabout.

7. An exhaust manifold for a multi-cylinder internal combustion engine comprising a plurality of separate conduits disposed side by side and closed at one end of said manifold and open at the other or discharge end thereof, each of said conduits having a plurality of paired inlet branches of which both branches of each pair are adapted for connection to a like number of exhaust ports of one of a selected group of dual exhausting cylinders of said engine, each of said conduits further having a longitudinally sequential series of alternating annular lands and grooves in the sides of the interior thereof, and an individual cylindrical liner for each conduit received on the lands and cooperating with the grooves to define a corresponding series of closed spaces, said conduits and said liners having means establishing cooperation therebetween to hold each liner at one end in a position fast against movement in a direction about its axis and in an axial direction, each of said liners having a plurality of ports in the side thereof having a dimension predeterminedly larger than the cross section of the inlet branches, the just noted liner engaging the lands on which it is received in a position such that each opening therein registers with and extends overlappingly beyond the mouth of the branch opening there adjacent at all points thereabout regardless of any foreshortening or expansion of the liner between its ends due to the effects of thermal shock.

8. An exhaust manifold for a multi-cylinder internal combustion engine comprising a plurality of separate conduits disposed side by side and closed at one end of said manifold and open at the other or discharge end thereof, each of said conduits having a plurality of inlet branches each adapted for connection with an exhaust port of one of a selected group of cylinders of said engine, each of said conduits further having longitudinally spaced apart alternate lands and grooves in the sides of the interior thereof, and an individual liner for each conduit supported by the lands and cooperating with the grooves to define chambers to interrupt heat flow, said conduits and said liners having means establishing cooperation therebetween to hold the individual liners at one end in a position fast against movement in a direction about their respective axes and in an axial direction, the individual liners being provided with a plurality of ports in the sides thereof having a dimension predeterminedly larger than the cross section of the inlet branches and the just noted position of the liner being such that each opening registers with and extends overlappingly beyond the mouth of the branch opening there adjacent at all points thereabout at all times regardless of changes in length of the liner due to thermal shock.

9. The combination according to claim 4 wherein the jacket means is plate aluminum having welded joints and wherein the liner is stainless steel tubing formed from rolled sheets.

10. The combination according to claim 4 wherein the individual manifolds are embodied in an aluminum casting having cored ports therein and the jacket means is sheet plate aluminum casting.

11. The combination according to claim 4 wherein the individual manifolds are incorporated in an aluminum casting having cored ports therein, the jacket means is plate aluminum having welded joints and the liners are stainless steel tubing formed from rolled sheets.

12. An exhaust manifold for a multi-cylinder internal combustion engine comprising a plurality of separate conduits disposed side by side and closed at one end of said manifold and open at the other or discharge end thereof, each of said conduits having a plurality of paired inlet branches of which the two branches of each pair are adapted for connection to a like number of exhaust ports of one of a selected group of dual exhausting cylinders of said engine, each of said conduits further having a plurality of alternating lands and grooves transversely disposed in the sides of the interior thereof, the separate mouths of the respective inlet branches being formed in different ones of said lands, and an individual longitudinally extending liner for each conduit received on the lands thereof and cooperating with the grooves to define closed dead air spaces, said conduits and the associated liners having means establishing cooperation therebetween to hold each liner at one end in a position fast against movement in a direction about its axis and in an axial direction, each liner having a plurality of ports in the side thereof at points opposite the lands and having a dimension predeterminedly larger than the cross section of the mouths of the adjacent inlet branches, the just noted position of the liner being such that each opening registers with and extends at least slightly laterally beyond the edges of the mouth of the adjacent inlet branch at all points thereabout.

References Cited in the file of this patent

UNITED STATES PATENTS

| | | |
|---|---|---|
| 2,125,703 | Williams | Aug. 2, 1938 |
| 2,251,604 | Sladky | Aug. 5, 1941 |
| 2,423,602 | Madgeburger | July 8, 1947 |
| 2,446,631 | Burks | Aug. 10, 1948 |
| 2,543,839 | Faris | Mar. 6, 1951 |
| 2,551,307 | Yingling | May 1, 1951 |

FOREIGN PATENTS

| | | |
|---|---|---|
| 1,017,738 | France | Sept. 24, 1952 |

UNITED STATES PATENT OFFICE
CERTIFICATE OF CORRECTION

Patent No. 2,858,667                                                November 4, 1958

Norman W. Reske

It is hereby certified that error appears in the printed specification of the above numbered patent requiring correction and that the said Letters Patent should read as corrected below.

Column 9, line 1, for "wells" read -- walls --; column 10, lines 54, 58, and 62, for the claim reference numeral "4", each occurrence, read -- 3 --; same column 10, line 61, strike out "casting".

Signed and sealed this 17th day of March 1959.

(SEAL)
Attest:

KARL H. AXLINE                                          ROBERT C. WATSON
Attesting Officer                                     Commissioner of Patents